Feb. 16, 1926.

H. R. STANDLEE 1,573,585

SWIVEL SWAB

Original Filed August 17, 1922

Inventor.
Harvey R. Standlee

By Ralph F. Baintt
Attorney.

Patented Feb. 16, 1926.

1,573,585

UNITED STATES PATENT OFFICE.

HARVEY R. STANDLEE, OF TULSA, OKLAHOMA.

SWIVEL SWAB.

Original application filed August 17, 1922, Serial No. 582,500. Divided and this application filed October 25, 1924. Serial No. 745,759.

*To all whom it may concern:*

Be it known that HARVEY R. STANDLEE, a citizen of the United States, residing at Tulsa, in the county of Tulsa and State of Oklahoma, has invented certain new and useful Improvements in Swivel Swabs, of which the following is a specification.

This application is a division of an application filed by me August 17, 1922, Serial No. 582,500, patented October 28, 1924, #1,513,649, the present invention relating particularly to a swivel support for deep well swabs.

One object of the invention is to provide a novel means for connecting the swab with the line whereby twisting of the cable or line will be accommodated without causing the rubber to rotate in the casing, thereby reducing wear on the rubber and prolonging the life of the same. It is also an object of the invention to so construct the swivel connection as to provide an ample opening for a full flow of fluid, although operating in a well with high gas pressure or heavy fluid. Other objects will appear incidentally in the course of the following description, and the invention resides in certain novel features which will be particularly pointed out in the appended claims.

Figure 1:
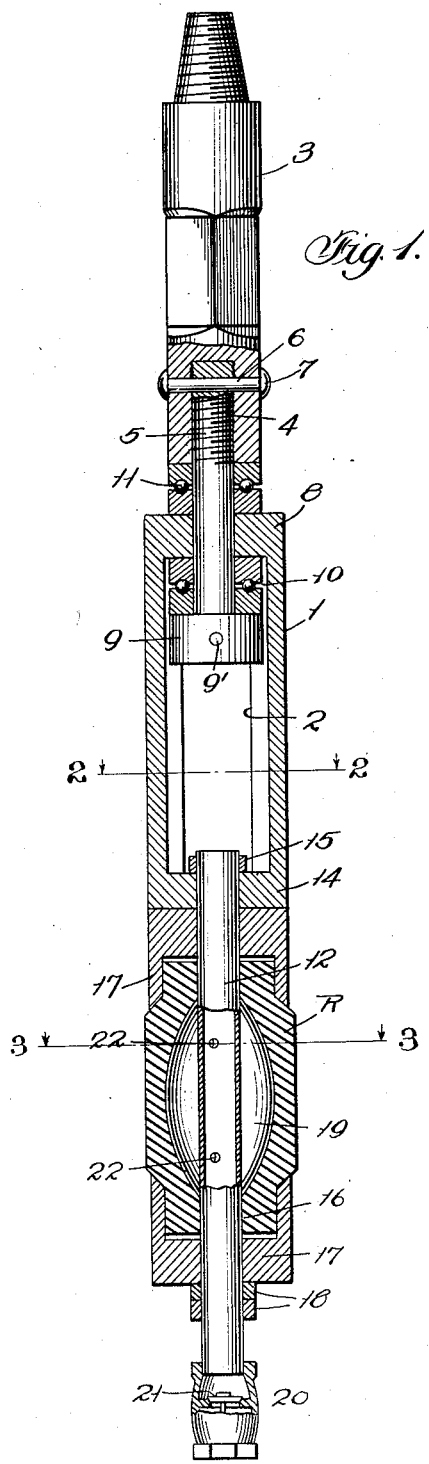
Figure 2:
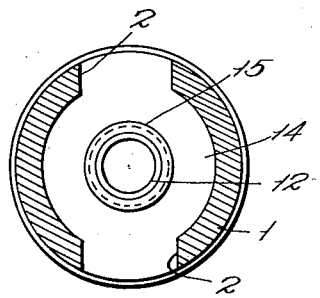
Figure 3:
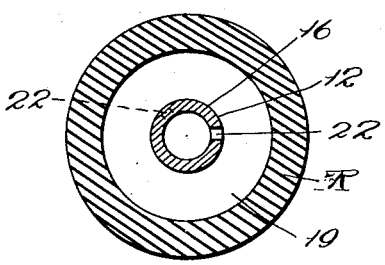

In the drawing, Figure 1 is a view partly in section and partly in elevation illustrating a swab embodying my invention;

Figure 2 is a sectional view taken substantially on the line 2—2 of Figure 1, looking in the direction of the arrows; and Figure 3 is a sectional view taken substantially on the line 3—3 of Figure 1, looking in the direction of the arrows.

As disclosed in the accompanying drawing, 1 denotes a cage of any desired dimensions. The wall of the cage at diametrically opposed points is provided with diametrically opposed slots 2 of a material width, as shown most clearly in Figure 2.

The upper connection or sub 3 is adapted to have secured thereto in a conventional manner a cable or swab line and the lower end portion of the upper connection or sub is provided at its axial center with a socket 4 which receives an end portion of an elongated pin 5, said pin 5 being locked to the connection or sub through the medium of the bolt 6 which is disposed transversely through the connection or sub 3 and through the inserted end portion of the pin 5. Associated with the bolt 6 is a clamping nut 7 operating in an obvious manner.

The pin 5 is extended through the upper end or head 8 of the cage and the end portion of said pin 5 within the cage is provided with an enlargement or head 9. The pin 5 provides means whereby the connection or sub 3 is swiveled to the cage 1 so that the twisting action of the cable or swab line is permitted to occur without causing rotation of the swab proper, and particularly when the swab is being lowered or dropped within a well casing.

Interposed between the enlargement or head 9 of the rod 5 and the upper end or head 8 of the cage 1 is an anti-friction medium generally indicated at 10 and interposed between the upper end or head 8 of the cage 1 and the adjacent or lower end of the connection or sub 3 is the anti-friction medium generally indicated at 11. This construction assures the desired free rotation of the connection or sub 3, and particularly as occasioned by the twisting of a cable or line with a minimum of frictional resistance.

The pin 5 is capable of rotating in the head 8 but the weight of the device is so great that the frictional resistance is sufficient in the ordinary coupling to cause the swab to rotate, when the line twists, so that there is great wear upon the rubber swab against the casing with a resultant necessity for renewing the rubber. In my device, the ball bearings take the weight off the pin 5 and permit the pin and sub to rotate freely with respect to the casing, the upper bearing 11 taking the thrust and relieving the friction when the device is being lowered, and the lower bearing 10 performing the same functions when the device is being raised.

12 denotes a mandrel of desired dimensions and which has one end portion fitted through the lower end or head 14 of the cage 1 and held therein by a lock nut 15. The use of the lock nut 15 is of decided advantage as it assures the maintenance of the mandrel 12 against displacement with respect to the cage 1. The use of this lock nut 15 is made possible in view of the fact that the slots 2 are relatively wide or broad and of a width greater than the width of the nut 15.

R denotes the swab rubber which is provided with an axial bore 16 through which the mandrel 12 is passed. The opposite end portions of the rubber R are reduced to provide extensions which are received within the sleeve rings 17, which afford protection for the end portions of the rubber R in addition to holding the same more rigidly in position after the rubber has been properly applied upon the mandrel. The rubber is rigidly and effectively maintained in its applied position through the instrumentality of the lock nuts 18 threaded upon the mandrel 12 and co-acting with the adjacent sleeve ring 17.

The intermediate portion 19 of the bore 16 of the rubber R is enlarged with its surface concave, said enlarged portion 19 being of a length equal to the distance between the extensions so that the intermediate porion of the rubber R is free of or out of contact with the mandrel 12. By this construction, the rubber readily adjusts itself in so far as the outside diameter thereof is concerned which is of particular advantage should the swab be forced through a tight place in the well casing as the large portion 19 of the bore will readily permit the rubber to contract and avoid injury from friction.

The lower or outer end of the mandrel has engaged therewith a valve casing 20 in which operates an inwardly opening check valve 21 so that when the swab is lowered within the casing the oil or the like will pass upwardly through the mandrel 12 into the cage 1 and out through the slots 2. By having the slots 2 materially wide or broad particles torn from the rubber R or other particles falling in the oil and passing up through the mandrel can readily escape through the slots 2 without clogging the same. This is of particular advantage because with the use of the swabs having relatively small openings in the cage such particles are liable to stop or clog such openings, resulting in the gas pressure created blowing the entire tool out of the well. That portion of the mandrel 12 disposed through the enlarged portion 19 of the bore 16 of the rubber is provided with relatively small openings 22 which permit the oil or the like above the swab to enter the portion 19, thereby forcing outwardly the working surface of the rubber and maintaining the same in close contact with the inner surface of the well casing and preventing any leakage back around the rubber.

The enlargement or head 9 of the pin or rod 5 has disposed radially therethrough an opening 9'. A bolt or kindred element is to be inserted through this opening 9' when it is desired to disconnect the upper connection or sub 3 from cage 1, said bolt or the like to be of a length to have requisite contact with the cage 1 to hold the pin or rod 5 stationary while the upper connection or sub 3 is being engaged with or disconnected from the pin or rod.

From the foregoing description it is thought to be obvious that a swab constructed in accordance with my invention is particularly well adapted for use by reason of the convenience and facility with which it may be assembled and operated, and it will also be obvious that my invention is susceptible of some change and modification without departing from the principles and spirit therof and for this reason I do not limit myself to the precise arrangement and formation of the several parts herein shown in carrying out my invention in practice except as hereinafter claimed.

Having thus fully described my invention, what I claim as new and desire to secure by Letters Patent of the United States is:—

1. In a swab, the combination of a tubular mandrel, a cage, an end portion of the mandrel being fitted through the cage in communication with the interior thereof, means coacting with the end portion of the mandrel within the cage for holding the mandrel against displacement with respect to the cage, said cage being slotted to permit positioning of said means, a sub, and means for swivelling the sub to the mandrel.

2. In a deep well swab, the combination of a cage, a swab rubber carried by the lower end of the cage, a sub, a pin secured in the sub and extending rotatably through the upper end of the cage, means for retaining the pin in the cage, and means interior and exterior of the cage for relieving the friction between the cage and the sub, upon movement to either direction.

3. In a deep well swab, the combination of a cage, a swab rubber carried by the lower end of the cage, a sub, a pin secured axially in the sub and extending axially into the upper end of the cage, a head on said pin within the cage, an antifriction bearing around the pin between said head and the upper end of the cage, and an anti friction bearing around the pin between the sub and the cage.

In testimony whereof I affix my signature.

HARVEY R. STANDLEE.